(12) United States Patent
Lee (10) Patent No.: US 9,716,885 B2
(45) Date of Patent: Jul. 25, 2017

(54) ENCODING SCHEME (71) Applicant: Empire Technology Development LLC, Wilmington, DE (US)

(72) Inventor: Hyoung-Gon Lee, Gyeonggi-do (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 523 days.

(21) Appl. No.: 14/128,692

(22) PCT Filed: Jul. 31, 2013

(86) PCT No.: PCT/US2013/053033
§ 371 (c)(1),
(2) Date: Dec. 23, 2013

(87) PCT Pub. No.: WO2015/016913
PCT Pub. Date: Feb. 5, 2015

(65) Prior Publication Data
US 2015/0172654 A1    Jun. 18, 2015

(51) Int. Cl.
*H04N 19/105*        (2014.01)
*H04N 19/159*        (2014.01)
*H04N 19/16*         (2014.01)
*H04N 19/172*        (2014.01)
(Continued)

(52) U.S. Cl.
CPC ......... *H04N 19/105* (2014.11); *H04N 19/114* (2014.11); *H04N 19/159* (2014.11); *H04N 19/16* (2014.11); *H04N 19/172* (2014.11); *H04N 19/597* (2014.11)

(58) Field of Classification Search
CPC .. H04N 19/105; H04N 19/159; H04N 19/114; H04N 19/172; H04N 19/597; H04N 19/16
See application file for complete search history.

(56) References Cited

U.S. PATENT DOCUMENTS 8,384,766 B2    2/2013  Routhier et al.
RE44,091 E      3/2013  Oda
(Continued)

OTHER PUBLICATIONS

Ding, L., et al, "Stereo Video Coding System with Hybrid Coding Based on Joint Prediction Scheme," IEEE International Symposium on Circuits and Systems (ISCAS), vol. 6, pp. 6082-6085 (2005).
(Continued)

*Primary Examiner* — Neil Mikeska
(74) *Attorney, Agent, or Firm* — Brundidge & Stanger, P.C.

(57) ABSTRACT

A method performed under control of an encoder may include receiving at least one picture frame during a first predetermined period, each of the at least one picture frame of the first predetermined period including a first offset image and a second offset image; encoding a first offset image of a first picture frame of the at least one picture frame of the first predetermined period; receiving at least one picture frame during a second predetermined period, each of the at least one picture frame of the second predetermined period including a first offset image and a second offset image; and encoding a second offset image of a first picture frame of the at least one picture frame of the second predetermined period.

20 Claims, 7 Drawing Sheets

(51) Int. Cl.
    *H04N 19/597* (2014.01)
    *H04N 19/114* (2014.01)

(56) References Cited

U.S. PATENT DOCUMENTS

| | | | |
|---|---|---|---|
| 2003/0156188 A1* | 8/2003 | Abrams, Jr. | H04N 13/0037 348/51 |
| 2008/0198920 A1 | 8/2008 | Yang et al. | |
| 2009/0060280 A1* | 3/2009 | Choi | G06T 7/0075 382/106 |
| 2011/0080949 A1 | 4/2011 | Takahashi et al. | |
| 2012/0050467 A1* | 3/2012 | Fuchie | H04N 13/0048 348/43 |
| 2012/0099645 A1 | 4/2012 | Bekiares et al. | |
| 2012/0224025 A1 | 9/2012 | Yu et al. | |
| 2012/0268558 A1 | 10/2012 | Choi et al. | |
| 2012/0293614 A1* | 11/2012 | Ikeda | G11B 27/034 348/42 |
| 2012/0294587 A1* | 11/2012 | Kawaguchi | H04N 13/0029 386/248 |
| 2012/0300031 A1* | 11/2012 | Horlander | H04N 13/0029 348/43 |
| 2013/0011047 A1* | 1/2013 | Kwon | G06K 9/00765 382/154 |
| 2013/0120526 A1* | 5/2013 | Narasimhan | H04N 13/0059 348/43 |
| 2013/0188743 A1 | 7/2013 | Chen | |

OTHER PUBLICATIONS

International Search Report with Written Opinion for International Application No. PCT/US2013/053033 mail on Oct. 16, 2013, ISA/US, Commissioner of Patents, Virginia, USA.

* cited by examiner

ENCODING SCHEME

CROSS-REFERENCE TO RELATED APPLICATION

This application is the U.S. National Stage filing under 35 U.S.C. §371 of International Application No. PCT/US13/53033, filed on Jul. 31, 2013.

BACKGROUND

Recently, there has been much interest in providing three-dimensional (3D) images or videos via a 3D television or a 3D monitor, etc. 3D images or videos may be used in various venues, such as movies, television broadcasting, medical devices, computer or video games, etc. 3D images may be created by using stereo images, i.e., two slightly different images directed at two eyes of a viewer. Recently, 3D image or video providers are paying more and more attention to how to efficiently increase encoding rate of the 3D images or videos and quality of the 3D images or videos.

SUMMARY

In an example, a method performed under control of an encoder may include receiving at least one picture frame during a first predetermined period, each of the at least one picture frame of the first predetermined period including a first offset image and a second offset image; encoding a first offset image of a first picture frame of the at least one picture frame of the first predetermined period; receiving at least one picture frame during a second predetermined period, each of the at least one picture frame of the second predetermined period including a first offset image and a second offset image; and encoding a second offset image of a first picture frame of the at least one picture frame of the second predetermined period.

In another example, an encoder may include a receiving unit configured to receive at least one picture frame during a first predetermined period, each of the at least one picture frame of the first predetermined period including a first offset image and a second offset image, and to receive at least one picture frame during a second predetermined period, each of the at least one picture frame of the second predetermined period including a first offset image and a second offset image; and an encoding unit configured to encode a first offset image of a first picture frame of the at least one picture frame of the first predetermined period to generate a first side Intra picture (I picture) of the first predetermined period, and to encode, based at least in part on the first side I picture of the first predetermined period, a second offset image of the first picture frame of the at least one picture frame of the first predetermined period, and to encode a second offset image of a first picture frame of the at least one picture frame of the second predetermined period to generate a second side I picture of the second predetermined period, and to encode, based at least in part on the second side I picture of the second predetermined period, a first offset image of the first picture frame of the at least one picture frame of the second predetermined period.

In yet another example, a computer-readable storage medium may store thereon computer-executable instructions that, in response to execution, cause an encoder to perform operations including receiving at least one picture frame during a first predetermined period, each of the at least one picture frame of the first predetermined period including a first offset image and a second offset image; encoding a first offset image of a first picture frame of the at least one picture frame of the first predetermined period; receiving at least one picture frame during a second predetermined period, each of the at least one picture frame of the second predetermined period including a first offset image and a second offset image; and encoding a second offset image of a first picture frame of the at least one picture frame of the second predetermined period.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to an encoder of three dimensional (3D) images. Technologies are generally described for an encoder that generates Intra pictures (I picture) by alternatively encoding offset images received from one of a left side camera and a right side camera.

In some examples, an encoder may be configured to receive, from a left side camera and a right side camera, multiple two dimensional (2D) offset images captured by the respective cameras. The encoder may be configured to alternatively encode offset images received from one of the left side camera and the right side camera to generate I pictures. By way of example, but not limitation, during a first predetermined period, the encoder may be configured to select an offset image captured by the left side camera as an encoding start image and encode the selected offset image to generate an I picture of the first predetermined period. Then, the encoder may be configured to encode following offset images based on the encoded I picture of the first predetermined period. Further, during a second predetermined period, the encoder may be configured to select an offset image captured by the right side camera as an encoding start image and encode the selected offset image to generate an I picture of the second predetermined period. Then, the encoder may be configured to encode following offset images based on the encoded I picture of the second predetermined period. The first predetermined "period" or second predetermined "period" may refer to a time period between generating a first I picture and generating a next I picture.

Figure 1:
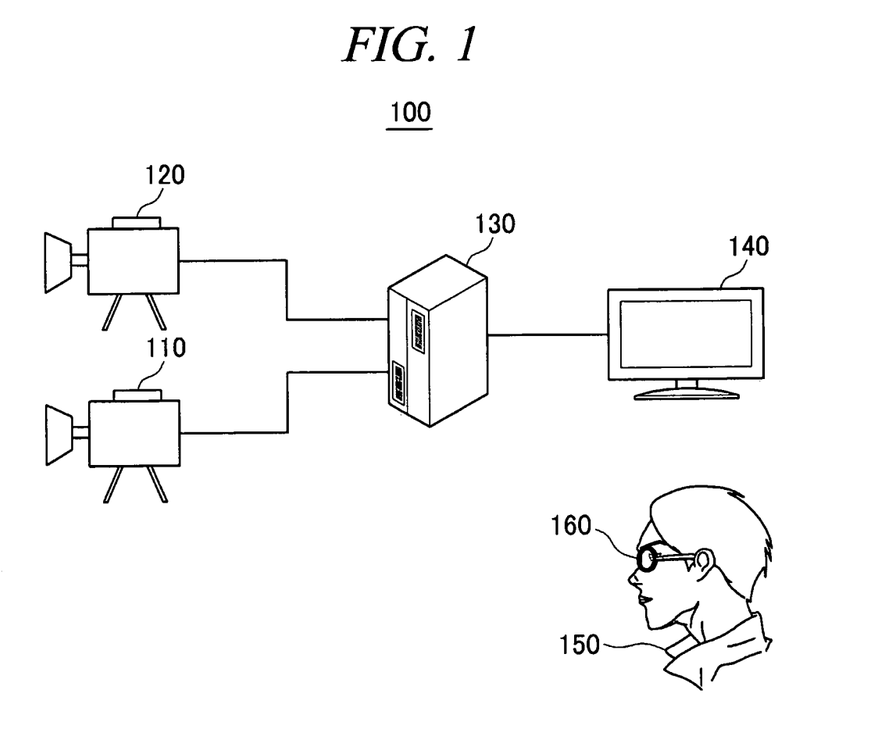
FIG. 1 schematically shows an illustrative example of a 3D image display environment including a left side camera, a right side camera, an encoder and a 3D image display device, arranged in accordance with at least some embodiments described herein.

FIG. 1 schematically shows an illustrative example of a 3D image display environment 100 including a left side camera 110, a right side camera 120, an encoder 130 and a 3D image display device 140, arranged in accordance with at least some embodiments described herein. In some embodiments, left side camera 110 may be configured to capture and generate multiple first offset images that may be perceived by a left eye of a user 150 and right side camera 120 may be configured to capture and generate multiple second offset images that may be perceived by a right eye of user 150.

In some embodiments, at least one of left side camera 110 or right side camera 120 may be configured to generate multiple picture frames, each of which includes one of the first offset images and one of the second offset images by combining the one of the first offset images and the one of the second offset images to be the each picture frame. One of left side camera 110 or right side camera 120 may be configured to generate the multiple picture frames by using one or more of well known image combining schemes such as a horizontal interleaved scheme, a vertical interleaved scheme, a checker board scheme, a side-by-side split scheme, or an above-below split scheme. A "picture frame" may refer to an image set which includes a left side image (e.g., first offset image) captured by left side camera 110 and a right side image (e.g., second offset image) captured by right side camera 120. Further, an "offset image" may refer to a two dimensional (2D) image captured by respective left side camera 110 and right side camera 120.

Encoder 130 may be configured to receive the multiple picture frames from one of left side camera 110 or right side camera 120 via a network. By way of example, but not limitation, the network may include a wired network such as LAN (Local Area Network), WAN (Wide Area Network), VAN (Value Added Network) or the like, or all kinds of wireless network such as a mobile radio communication network, a satellite network, a bluetooth, WiBro (Wireless Broadband Internet), Mobile WiMAX, HSDPA (High Speed Downlink Packet Access) or the like.

In some embodiments, encoder 130 may be configured to receive "n" number of picture frames during a first period. Each of the "n" picture frames may include a first offset image and a second offset image. By way of example, but not limitation, the first period may be predefined by encoder 130 as a first I picture period (e.g., $(2n-1)^{th}$ I picture period) that is a time period that extends from the time a first I picture is generated to the time before a next I picture is generated. Further, the number 'n' of picture frames received by encoder 130 during the first period may be predefined by encoder 130.

Encoder 130 may be further configured to split each received picture frame into the first offset image and second offset image. Encoder 130 may be further configured to encode the first offset image to generate an I picture of the first period. Then, encoder 130 may be configured to encode the second offset image based on the encoded I picture of the first period to generate a Predictive picture (P picture). By way of example, but not limitation, encoder 130 may be configured to encode the first offset image and the second offset image by performing one or more well-known encoding processes including a Motion Estimation (ME) and a Motion Compensation (MC). Each offset image may be divided into macroblocks and motion difference between the first offset image and the second offset image may be compensated based on a location of the macroblocks of the second offset image and a location of the macroblocks of the first offset image. Then, encoder 130 may be further configured to perform a discrete cosine transform (DCT) process and a quantization process to compress the encoded first offset image (e.g., I picture) and the encoded second offset image (e.g., P picture). So, a file size of the respective encoded first offset image and encoded second offset image may be compressed.

During the first period, encoder 130 may be configured to encode respective first offset images and second offset images of a second picture frame to an $n^{th}$ picture frame of the first period based at least in part on at least one of previous first offset images and second offset images or subsequent first offset images and second offset images.

An I picture may refer to a picture that is generated by encoding an original offset image independently and a P picture may refer to a picture that is generated by encoding the original offset image by referring to at least one previous offset image.

Further, during a second period, encoder 130 may be configured to receive 'n' number of picture frames, each of which may include a first offset image and a second offset image. By way of example, but not limitation, the second period may be predefined by encoder 130 as a second I picture period (e.g., $(2n)^{th}$ I picture period) that is a period from the time the second I picture is generated to the time before a next I picture is generated. Further, the number 'n' of picture frames received by encoder 130 during the second period may be predefined by encoder 130.

Encoder 130 may be further configured to split each received picture frame into the first offset image and second offset image. Encoder 130 may be further configured to encode the second offset image to generate an I picture of the second period. Then, encoder 130 may be configured to encode the first offset image based on the encoded I picture of the second period to generate a P picture. Encoder 130 may be further configured to perform the discrete cosine transform (DCT) process and the quantization process to compress the encoded first offset image (e.g., P picture) and the encoded second offset image (e.g., I picture). Thus, a file size of the respective encoded first offset image and encoded second offset image may be efficiently compressed.

During the second period, encoder 130 may be configured to encode respective first offset images and second offset images of a second picture frame to an $n^{th}$ picture frame of the second period based at least in part on at least one of previous first offset images and second offset images or subsequent first offset images and second offset images.

Further, during a third period (e.g., $(2n+1)^{th}$ I picture period), encoder 130 may be configured to receive at least one picture frame which includes a first offset image and a second offset image and to split the received picture frame into the first offset image and second offset image. Encoder 130 may be further configured to encode the first offset image to generate an I picture of the third period. Then, encoder 130 may be configured to encode the second offset image based on the encoded I picture of the third period to generate a P picture.

In this way, encoder 130 may be configured to select and encode one of a first offset image which is captured by left side camera 110 and a second offset image which is captured by a right side camera 120 alternatively to generate an I picture.

Encoder 130 may be further configured to transmit the encoded first offset images and encoded second offset images to 3D image display device 140 via a network. By way of example, but not limitation, 3D image display device 140 may refer to a display device capable of displaying 3D images or videos, such as a 3D television, a 3D screen, or a 3D monitor etc.

3D image display device 140 may be configured to decode the encoded offset images into the original offset images (e.g., first offset images and second offset images). In some embodiments, 3D image display device 140 may decode the I picture of each period independently and decode the P picture of each period based on the I picture. Then, 3D. image display device 140 may be further configured to display the decoded offset images on a screen operatively coupled to 3D image display device 140. By way of example, 3D image display device 140 may display the first offset images and second offset images alternatively. A user 150 may see 3D images or videos including the decoded offset images by using a 3D glasses 160.

Figure 2:
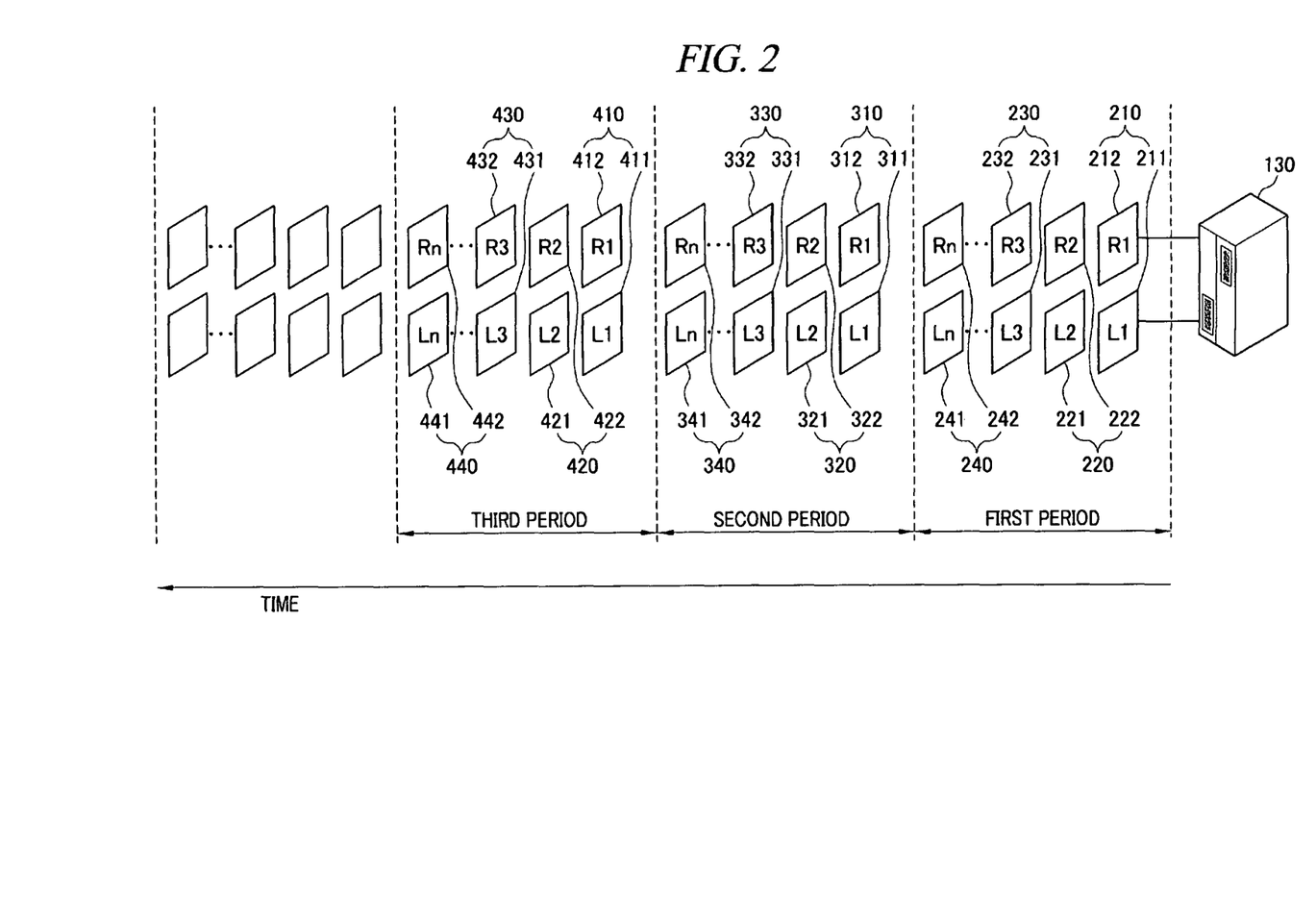
FIG. 2 shows an illustrative example of picture frames received by an encoder, arranged in accordance with at least some embodiments described herein.

FIG. 2 shows an illustrative example of picture frames received by encoder 130, arranged in accordance with at least some embodiments described herein. As depicted in FIG. 2, during a first period, encoder 130 may be configured to receive a first picture frame 210, a second picture frame 220, a third picture frame 230 and an $n^{th}$ picture frame 240 from at least one of left side camera 110 and right side camera 120. First picture frame 210 may include a first offset image 211 and a second offset image 212. Second picture frame 220 may include a first offset image 221 and a second offset image 222. Third picture frame 230 may include a first offset image 231 and a second offset image 232. $N^{th}$ picture frame 240 may include a first offset image 241 and a second offset image 242. By way of example, first offset images 211, 221, 231 and 241 may be captured by left side camera 110 and second offset images 212, 222, 232 and 242 may be captured by right side camera 120.

Further, during a second period, encoder 130 may be configured to receive a first picture frame 310, a second picture frame 320, a third picture frame 330 and an $n^{th}$ picture frame 340 from at least one of left side camera 110 and right side camera 120. First picture frame 310 may include a first offset image 311 and a second offset image 312. Second picture frame 320 may include a first offset image 321 and a second offset image 322. Third picture frame 330 may include a first offset image 331 and a second offset image 332. $N^{th}$ picture frame 340 may include a first offset image 341 and a second offset image 342. By way of example, first offset images 311, 321, 331 and 341 may be captured by left side camera 110 and second offset images 312, 322, 332 and 342 may be captured by right side camera 120.

Further, during a third period, encoder 130 may be configured to receive a first picture frame 410, a second picture frame 420, a third picture frame 430 and an $n^{th}$ picture frame 440 from at least one of left side camera 110 and right side camera 120. First picture frame 410 may include a first offset image 411 and a second offset image 412. Second picture frame 420 may include a first offset image 421 and a second offset image 422. Third picture frame 430 may include a first offset image 431 and a second offset image 432. $N^{th}$ picture frame 440 may include a first offset image 441 and a second offset image 442. By way of example, first offset images 411, 421, 431 and 441 may be captured by left side camera 110 and second offset images 412, 422, 432 and 442 may be captured by right side camera 120.

The number of picture frames (i.e., the number of 'n') received by encoder 130 during one period (e.g., the first period or the second period or the third period) may be predefined by encoder 130. Further, in FIG. 2, although all of first offset images (211, 221, 231, 241, 311, 321, 331, 341, 411, 421, 431, 441) are described to be captured from left side camera 110 and all of second offset images (212, 222, 232, 242, 312, 322, 332, 342, 412, 422, 432, 442) are described to be captured from right side camera 120, alternative embodiments may contemplate all of the first offset images being captured from right side camera 120 and all of the second offset images being captured by left side camera 110.

Figure 3A:
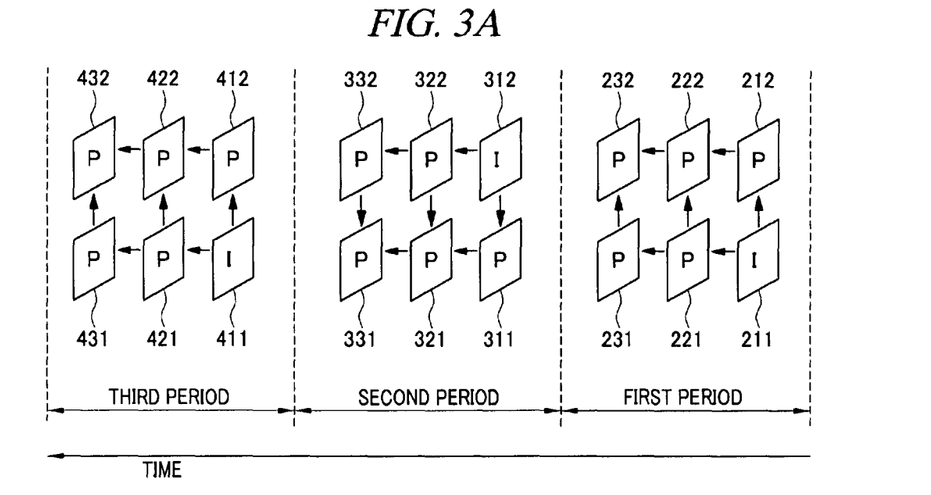
FIG. 3A shows an illustrative example of offset images encoded by an encoder, arranged in accordance with at least some embodiments described herein.

FIG. 3A shows an illustrative example of offset images encoded by encoder 130, arranged in accordance with at least some embodiments described herein. By way of example, but not limitation, encoder 130 may be configured to receive three picture frames 210, 220, 230 during a first period. Encoder 130 may be further configured to split first picture frame 210 into first offset image 211 and second offset image 212, split second picture frame 220 into first offset image 221 and second offset image 222, and split third picture frame 230 into first offset image 231 and second offset image 232.

In some embodiments, encoder 130 may be configured to encode first offset image 211 to generate an I picture of the first period. Then, encoder 130 may be configured to encode second offset image 212 based at least in part on the encoded first offset image 211 (i.e., the I picture of the first period) to generate a P picture of second offset image 212.

Further, encoder 130 may be configured to encode first offset image 221 based at least in part on the encoded first offset image 211 (i.e., the I picture of the first period) to generate a P picture of first offset image 221. Encoder 130 may be further configured to encode second offset image 222 based at least in part on at least one of the encoded second offset image 212 or the encoded first offset image 221 and to generate a P picture of second offset image 222.

Then, encoder 130 may be configured to encode first offset image 231 based at least in part on the encoded first offset image 221 to generate a P picture of first offset image 231. Encoder 130 may be further configured to encode second offset image 232 based at least in part on at least one of the encoded second offset image 222 or the encoded first offset image 231 and to generate a P picture of second offset image 232.

Further, by way of example, but not limitation, encoder 130 may be configured to receive three picture frames 310, 320, 330 during a second period. Encoder 130 may be further configured to split first picture frame 310 into first offset image 311 and second offset image 312, split second picture frame 320 into first offset image 321 and second offset image 322, and split third picture frame 330 into first offset image 331 and second offset image 332.

Encoder 130 may be configured to encode second offset image 312 to generate an I picture of the second period. Then, encoder 130 may be configured to encode first offset image 311 based at least in part on the encoded second offset image 312 (i.e., the I picture of the second period) and to generate a P picture of first offset image 311.

Further, encoder 130 may be configured to encode second offset image 322 based at least in part on the encoded second offset image 312 (i.e., the I picture of the second period) and to generate a P picture of second offset image 322. Encoder 130 may be further configured to encode first offset image 321 based at least in part on at least one of the encoded first offset image 311 or the encoded second offset image 322 and to generate a P picture of first offset image 321.

Then, encoder 130 may be configured to encode second offset image 332 based at least in part on the encoded second offset image 322 and to generate a P picture of second offset image 332. Encoder 130 may be further configured to encode first offset image 331 based at least in part on at least one of the encoded first offset image 321 or the encoded second offset image 332 and to generate a P picture of first offset image 331.

Further, by way of example, but not limitation, encoder 130 may be configured to receive three picture frames 410, 420, 430 during a third period. Encoder 130 may be further configured to split first picture frame 410 into first offset image 411 and second offset image 412, split second picture frame 420 into first offset image 421 and second offset image 422, and split third picture frame 430 into first offset image 431 and second offset image 432.

Encoder 130 may be configured to encode first offset image 411 and generate an I picture of the third period. Then, encoder 130 may be further configured to encode second offset image 412 based at least in part on the encoded first offset image 411 (i.e., the I picture of the third period) and to generate a P picture of second offset image 412.

Further, encoder 130 may be configured to encode first offset image 421 based at least in part on the encoded first offset image 411 (i.e., the I picture of the third period) and to generate a P picture of first offset image 421. Encoder 130 may be further configured to encode second offset image 422 based at least in part on at least one of the encoded second offset image 412 or the encoded first offset image 421 and to generate a P picture of second offset image 422.

Then, encoder 130 may be configured to encode first offset image 431 based at least in part on the encoded first offset image 421 to generate a P picture of first offset image 431. Encoder 130 may be further configured to encode second offset image 432 based at least in part on at least one of the encoded second offset image 422 or the encoded first offset image 431 and to generate a P picture of second offset image 432.

In FIG. 3A, it is described that encoder 130 receives three picture frames during each of the first period, second period and third period, but the number of picture frames received during each period may be changed.

Figure 3B:
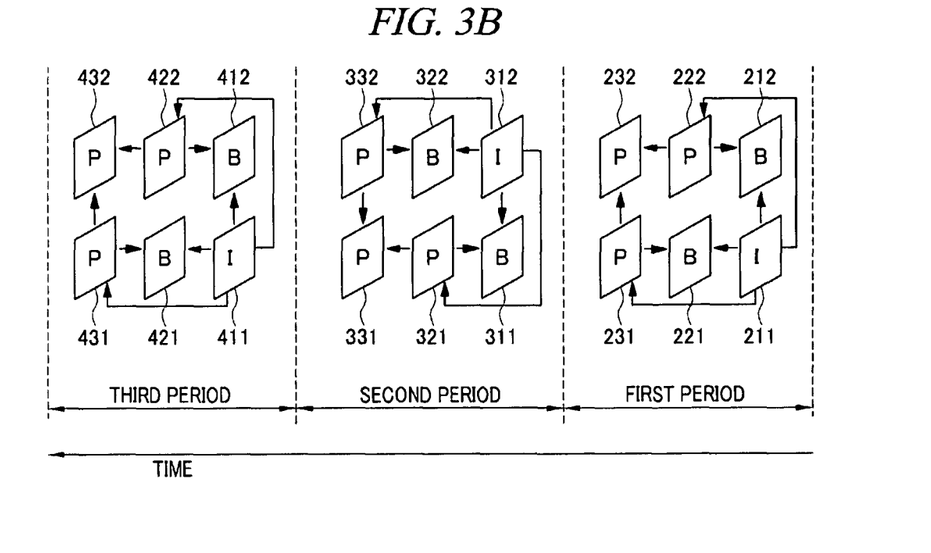
FIG. 3B shows another illustrative example of offset images encoded by an encoder, arranged in accordance with at least some embodiments described herein.

FIG. 3B shows another illustrative example of offset images encoded by encoder 130, arranged in accordance with at least some embodiments described herein. In some embodiments, encoder 130 may be configured to encode first offset image 211 to generate an I picture of the first period. Then, encoder 130 may be configured to encode second offset image 212 based at least in part on the encoded first offset image 211 (i.e., the I picture of the first period) and second offset image 222 or based at least in part on second offset image 222 so that encoder 130 may generate a Bi-predictive picture (B picture) of second offset image 212. A B picture may refer to a picture that is generated by encoding an original image by referring to at least one subsequent image.

Further, encoder 130 may be configured to encode first offset image 221 based at least in part on the encoded first offset image 211 (i.e., the I picture of the first period) and first offset image 231 or based at least in part on first offset image 231 so that encoder 130 may generate a B picture of first offset image 221. Encoder 130 may be further configured to encode second offset image 222 based at least in part on at least one of the encoded first offset image 211 and to generate a P picture of second offset image 222.

Then, encoder 130 may be configured to encode first offset image 231 based at least in part on the encoded first offset image 211 to generate a P picture of first offset image 231. Encoder 130 may be further configured to encode second offset image 232 based at least in part on at least one of the encoded second offset image 222 or the encoded first offset image 231 and to generate a P picture of second offset image 232.

Further, encoder 130 may be configured to encode second offset image 312 and generate an I picture of the second period. Then, encoder 130 may be configured to encode first offset image 311 based at least in part on the encoded second offset image 312 (i.e., the I picture of the second period) and first offset image 321 or based at least in part on first offset image 321 so that encoder 130 may generate a B picture of first offset image 311.

Further, encoder 130 may be configured to encode second offset image 322 based at least in part on the encoded second offset image 312 (i.e., the I picture of the second period) and second offset image 332 or based at least in part on second offset image 332 so that encoder 130 may generate a B picture of second offset image 322. Encoder 130 may be further configured to encode first offset image 321 based at least in part on at least one of the encoded second offset image 312 and to generate a P picture of first offset image 321.

Then, encoder 130 may be configured to encode second offset image 332 based at least in part on the encoded second offset image 312 and to generate a P picture of second offset image 332. Encoder 130 may be further configured to encode first offset image 331 based at least in part on at least one of the encoded first offset image 321 or the encoded second offset image 332 and to generate a P picture of first offset image 331.

Further, encoder 130 may be configured to encode first offset image 411 and generate an I picture of the third period. Then, encoder 130 may be configured to encode second offset image 412 based at least in part on the encoded first offset image 411 (i.e., the I picture of the third period) and second offset image 422 or based at least in part on second offset image 422 so that encoder 130 may generate a B picture of second offset image 412.

Further, encoder 130 may be configured to encode first offset image 421 based at least in part on the encoded first offset image 411 (i.e., the I picture of the third period) and first offset image 431 or based at least in part on first offset image 431 so that encoder 130 may generate a B picture of first offset image 421. Encoder 130 may be further configured to encode second offset image 422 based at least in part on the encoded first offset image 411 and generate a P picture of second offset image 422.

Then, encoder 130 may be configured to encode first offset image 431 based at least in part on the encoded first offset image 411 and to generate a P picture of first offset image 431. Encoder 130 may be further configured to encode second offset image 432 based at least in part on at least one of the encoded second offset image 422 or the encoded first offset image 431 and generate a P picture of second offset image 432.

In accordance with FIG. 3B, encoder 130 encodes second offset image 212, first offset image 221, first offset image 311, second offset image 322, second offset image 412 and first offset image 421 into the B picture. Alternatively, encoder 130 may further encode at least one of other offset images 222, 231, 232, 321, 331, 332, 422, 431, 432 into a B picture.

Figure 4:
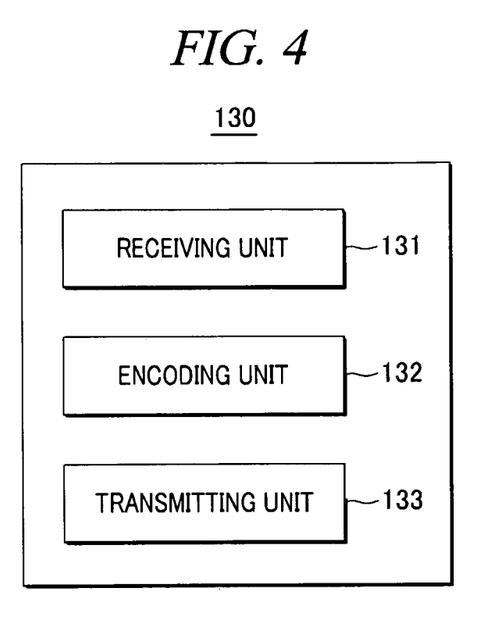
FIG. 4 shows schematic block diagram illustrating an example architecture for an encoder, arranged in accordance with at least some embodiments described herein.

FIG. 4 shows a schematic block diagram illustrating an example architecture for encoder 130, arranged in accordance with at least some embodiments described herein. As depicted in FIG. 4, encoder 130 may include a receiving unit 131, an encoding unit 132, and a transmitting unit 133. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of receiving unit 131, encoding unit 132, and transmitting unit 133 may be included in an instance of an application hosted on encoder 130.

Receiving unit 131 may be configured to receive, from left side camera 110 and right side camera 120 via a network, at least one picture frame during a first period. Each of the at least one picture frame received during the first period may include a first offset image that is captured by left side camera 110 and a second offset image that is captured by right side camera 120. The number of picture frames received by receiving unit 131 during the first period may be predefined in a local memory of encoder 130. By way of example, but not limitation, receiving unit 131 may receive "n" number of picture frames during the first period.

Further, receiving unit 131 may be configured to receive, from left side camera 110 and right side camera 120 via a network, at least one picture frame during a second period. Each of the at least one picture frame received during the second period may include a first offset image that is captured by left side camera 110 and a second offset image that is captured by right side camera 120. By way of example, but not limitation, receiving unit 131 may receive "n" number of picture frames during the second period.

Encoding unit 132 may be configured to split each of the at least one picture frame received during the first period into the first offset image and the second offset image. Further, encoding unit 132 may be configured to split each of the at least one picture frame received during the second period into the first offset image and the second offset image.

Encoding unit 132 may be configured to encode each first offset image and each second offset image while alternatively selecting one of the first offset image and the second offset image to generate an I picture according to the period (e.g., the first period or the second period). In some embodiments, by way of example, but not limitation, during the first period, encoding unit 132 may be configured to encode a first offset image of a first picture frame to generate an I picture of the first period. Further, encoding unit 132 may be configured to encode a second offset image of the first picture frame based at least in part on the I picture of the first period and to generate a P picture.

During the first period, encoding unit 132 may encode respective first offset images and second offset images of a second picture frame to an $n^{th}$ picture frame of the first period. Encoding unit 132 may encode each of the first offset images and each of the second offset images based at least in part on at least one of previous first offset images and second offset images or subsequent first offset images and second offset images. By way of example, but not limitation, encoding unit 132 may be configured to encode a first offset image of a second picture frame based at least in part on the I picture of the first period and to generate a P picture. Further, encoding unit 132 may be configured to encode a second offset image of the second picture frame based at least in part on at least one of the encoded second offset image of the first picture frame or the encoded first offset image of the second picture frame and to generate a P picture.

Further, by way of example, but not limitation, during the second period, encoding unit 132 may be configured to encode a second offset image of a first picture frame and to generate an I picture of the second period. Further, encoding unit 132 may be configured to encode a first offset image of the first picture frame of the second period based at least in part on the I picture of the second period and to generate a P picture.

During the second period, encoding unit 132 may encode respective first offset images and second offset images of a second picture frame to an $n^{th}$ picture frame of the second period. Encoding unit 132 may encode each of the first offset images and each of the second offset images based at least in part on at least one of previous first offset images and second offset images or subsequent first offset images and second offset images. By way of example, but not limitation, encoding unit 132 may be configured to encode a second offset image of a second picture frame based at least in part on the I picture of the second period and to generate a P picture. Further, encoding unit 132 may be configured to encode a first offset image of the second picture frame of the second period based at least in part on at least one of the encoded first offset image of the first picture frame of the second period or the encoded second offset image of the second picture frame of the second period and to generate a P picture.

In some other embodiments, by way of example, but not limitation, during the first period, encoding unit 132 may be configured to encode a first offset image of a first picture frame to generate an I picture of the first period. Further, encoding unit 132 may be configured to encode a second offset image of the first picture frame based at least in part on at least one of the I picture of the first period or a second offset image of a second picture frame and to generate a P picture or a B picture. During the first period, encoding unit 132 may be configured to encode a first offset image of a second picture frame based at least in part on at least one of the I picture of the first period or a first offset image of a third picture frame and to generate a P picture or a B picture. Further, encoding unit 132 may be configured to encode a second offset image of the second picture frame based at least in part on at least one of the I picture of the first period, the encoded second offset image of the first picture frame or the encoded first offset image of the second picture frame and to generate a P picture.

Further, by way of example, but not limitation, during the second period, encoding unit 132 may be configured to encode a second offset image of a first picture frame and to generate an I picture of the second period. Further, encoding unit 132 may be configured to encode a first offset image of the first picture frame of the second period based at least in part on at least one of the I picture of the second period or a first offset image of a second picture frame and to generate a P picture or a B picture. During the second period, encoding unit 132 may be configured to encode a second offset image of a second picture frame based at least in part on at least one of the I picture of the second period or a second offset image of a third picture frame and to generate a P picture or a B picture. Further, encoding unit 132 may be configured to encode a first offset image of the second picture frame of the second period based at least in part on at least one of the I picture of the second period, the encoded first offset image of the first picture frame of the second period or the encoded second offset image of the second picture frame of the second period to and generate a P picture.

Further, encoding unit 132 may be configured to compress the encoded first offset images and second offset images by performing a discrete cosine transform (DCT) process and a quantization process. Thus, a file size of the respective encoded first offset images and encoded second offset images may be efficiently compressed.

Transmitting unit 133 may be configured to transmit the encoded first offset images and second offset images, which are compressed by encoding unit 132, to 3D image display device 140 via a network between encoder 130 and 3D image display device 140.

Figure 5:
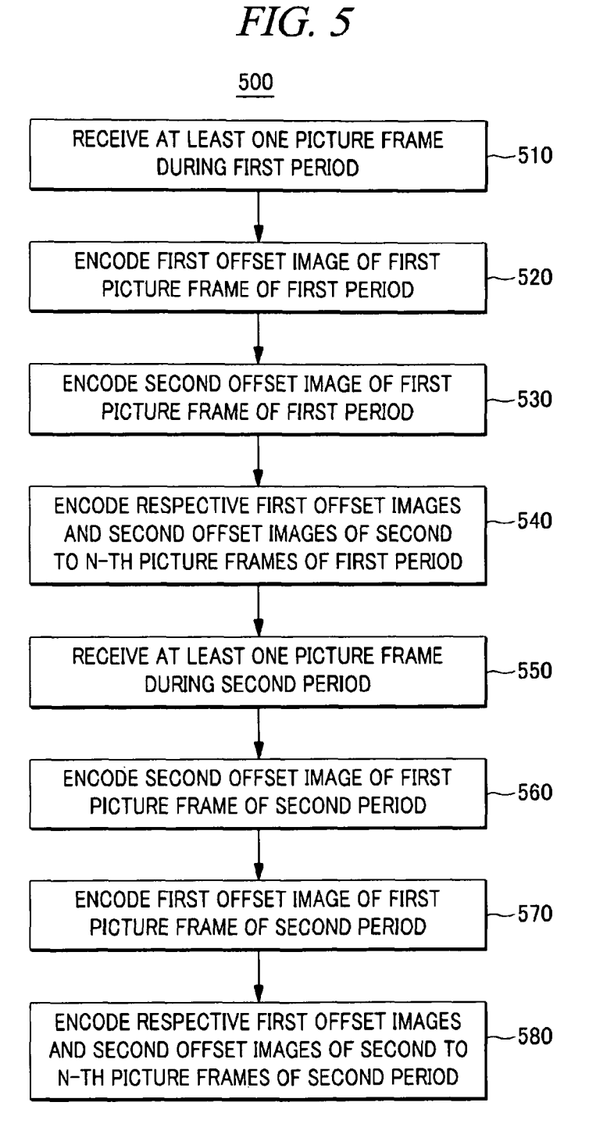
FIG. 5 shows an example flow diagram of a process for encoding offset images, arranged in accordance with at least some embodiments described herein.

FIG. 5 shows an example flow diagram of a process 500 for encoding offset images, arranged in accordance with at least some embodiments described herein. The method in FIG. 5 may be implemented in 3D image display environment 100 including left side camera 110, right side camera 120, and encoder 130, as illustrated in FIG. 1. An example process may include one or more operations, actions, or functions as illustrated by one or more blocks 510, 520, 530, 540, 550, 560, 570, and/or 580. Although illustrated as discrete blocks, various blocks may be divided into additional blocks, combined into fewer blocks, or eliminated, depending on the desired implementation. Processing may begin at block 510.

At block 510 (Receive at least one Picture Frame during First Period), encoder 130 may receive, from left side camera 110 and right side camera 120 via a network, at least one picture frame during a first period. By way of example, but not limitation, encoder 130 may receive "n" number of picture frames during the first period. The number 'n' of picture frames received during the first period may be predefined in a local memory of encoder 130. Each of the at least one picture frame received during the first period may include a first offset image that is captured by left side camera 110 and a second offset image that is captured by right side camera 120. Processing may proceed from block 510 to block 520.

At block 520 (Encode First Offset Image of First Picture Frame of First Period), encoder 130 may split each of the at least one picture frame received at block 510 into the first offset image and the second offset image. Further, at block 520, encoder 130 may encode a first offset image of a first picture frame of the first period to generate an I picture of the first period. By way of example, encoder 130 may encode the first offset image by performing well-known encoding processes including a Motion Estimation (ME) and a Motion Compensation (MC). Processing may proceed from block 520 to block 530.

At block 530 (Encode Second Offset Image of First Picture Frame of First Period), encoder 130 may encode a second offset image of the first picture frame of the first period. By way of example, but not limitation, at block 530, encoder 130 may encode the second offset image of the first picture frame to generate a P picture based at least in part on the I picture generated at block 520. By way of another example, but not limitation, at block 530, encoder 130 may encode the second offset image of the first picture frame to generate a P picture or a B picture based at least in part on at least one of the I picture generated at block 520 or a second offset image of a second picture frame which is subsequent to the first picture frame. Processing may proceed from block 530 to block 540.

At block 540 (Encode Respective First Offset Images and Second Offset Images of Second to N-th Picture Frames of First Period), encoder 130 may encode respective first offset images and second offset images of a second picture frame to a n-th picture frame of the first period. Encoder 130 may encode each of the first offset images and each of the second offset images based at least in part on at least one of previous first offset images and second offset images or subsequent first offset images and second offset images. By way of example, but not limitation, encoder 130 may encode a first offset image of a second picture frame to generate a P picture based at least in part on the I picture generated at block 520. Further, encoder 130 may encode a second offset image of the second picture frame to generate a P picture based at least in part on at least one of the encoded second offset image of the first picture frame or the encoded first offset image of the second picture frame.

By way of another example, but not limitation, at block 540, encoder 130 may encode a first offset image of a second picture frame to generate a P picture or a B picture based at least in part on at least one of the I picture generated at block 520 or a first offset image of a third picture frame. Further, encoder 130 may encode a second offset image of the second picture frame to generate a P picture based at least in part on at least one of the I picture generated at block 520, the encoded second offset image of the first picture frame or the encoded first offset image of the second picture frame. Processing may proceed from block 540 to block 550.

At block 550 (Receive at least one Picture Frame during Second Period), encoder 130 may receive, from left side camera 110 and right side camera 120 via a network, at least one picture frame during a second period. By way of example, but not limitation, encoder 130 may receive "n" number of picture frames during the second period. Each of the at least one picture frame received during the second period may include a first offset image that is captured by left side camera 110 and a second offset image that is captured by right side camera 120. Processing may proceed from block 550 to block 560.

At block 560 (Encode Second Offset Image of First Picture Frame of Second Period), encoder 130 may split each of the at least one picture frame received at block 550 into the first offset image and the second offset image. Further, at block 560, encoder 130 may encode a second offset image of a first picture frame of the second period to generate an I picture of the second period. Processing may proceed from block 560 to block 570.

At block 570 (Encode First Offset Image of First Picture Frame of Second Period), encoder 130 may encode a first offset image of the first picture frame of the second period. By way of example, but not limitation, at block 570, encoder 130 may encode the first offset image of the first picture frame to generate a P picture based at least in part on the I picture generated at block 560. By way of another example, but not limitation, at block 570, encoder 130 may encode the first offset image of the first picture frame to generate a P picture or a B picture based at least in part on at least one of the I picture generated at block 560 or a first offset image of a second picture frame which is subsequent to the first picture frame. Processing may proceed from block 570 to block 580.

At block 580 (Encode Respective First Offset Images and Second Offset Images of Second to N-th Picture Frames of Second Period), encoder 130 may encode respective first offset images and second offset images of from a second picture frame to a n-th picture frame of the second period. Encoder 130 may encode each of the first offset images and each of the second offset images based at least in part on at least one of previous first offset images and second offset images or subsequent first offset images and second offset images. By way of example, but not limitation, encoder 130 may encode a second offset image of a second picture frame to generate a P picture based at least in part on the I picture generated at block 560. Further, encoder 130 may encode a first offset image of the second picture frame to generate a P picture based at least in part on at least one of the encoded first offset image of the first picture frame or the encoded second offset image of the second picture frame.

By way of another example, but not limitation, at block 580, encoder 130 may encode a second offset image of a second picture frame to generate a P picture or a B picture based at least in part on at least one of the I picture generated at block 560 or a second offset image of a third picture frame. Further, encoder 130 may encode a first offset image of the second picture frame to generate a P picture based at least in part on at least one of the I picture generated at block 560, the encoded first offset image of the first picture frame or the encoded second offset image of the second picture frame.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
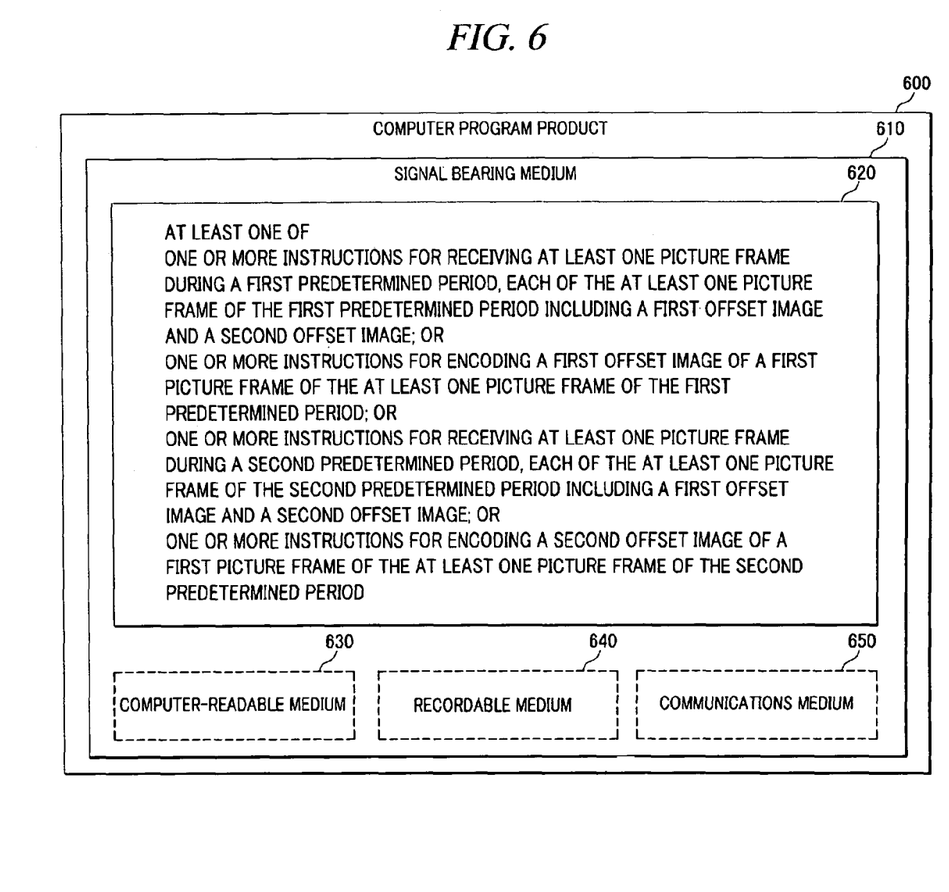
FIG. 6 illustrates computer program products that may be utilized to provide a scheme for encoding offset images, arranged in accordance with at least some embodiments described herein.

FIG. 6 illustrates computer program products that may be utilized to provide a scheme for encoding offset images, arranged in accordance with at least some embodiments described herein. Computer program product 600 may include a signal bearing medium 610. Signal bearing medium 610 may include one or more instructions 620 that, when executed by, for example, a processor, may provide the functionality described above with respect to FIGS. 1-5. By way of example, but not limitation, instructions 620 may include: one or more instructions for receiving at least one picture frame during a first predetermined period, each of the at least one picture frame of the first predetermined period including a first offset image and a second offset image; one or more instructions for encoding a first offset image of a first picture frame of the at least one picture frame of the first predetermined period; one or more instructions for receiving at least one picture frame during a second predetermined period, each of the at least one picture frame of the second predetermined period including a first offset image and a second offset image; one or more instructions for encoding a second offset image of a first picture frame of the at least one picture frame of the second predetermined period. Thus, for example, referring to FIG. 5, encoder 130 may undertake one or more of the blocks shown in FIG. 5 in response to instructions 620.

In some implementations, signal bearing medium 610 may encompass a computer-readable medium 630, such as, but not limited to, a hard disk drive (HDD), a compact disc (CD), a digital versatile disk (DVD), a digital tape, memory, etc In some implementations, signal bearing medium 610 may encompass a recordable medium 640, such as, but not limited to, memory, read/write (R/W) CDs, R/W DVDs, etc. In some implementations, signal bearing medium 610 may encompass a communications medium 650, such as, but not limited to, a digital and/or an analog communication medium (e.g., a fiber optic cable, a waveguide, a wired communication link, a wireless communication link, etc). Thus, for example, computer program product 600 may be conveyed to one or more modules of encoder 130 by an RF signal bearing medium 610, where the signal bearing medium 610 is conveyed by a wireless communications medium 650 (e.g., a wireless communications medium conforming with the IEEE 802.11 standard).

Figure 7:
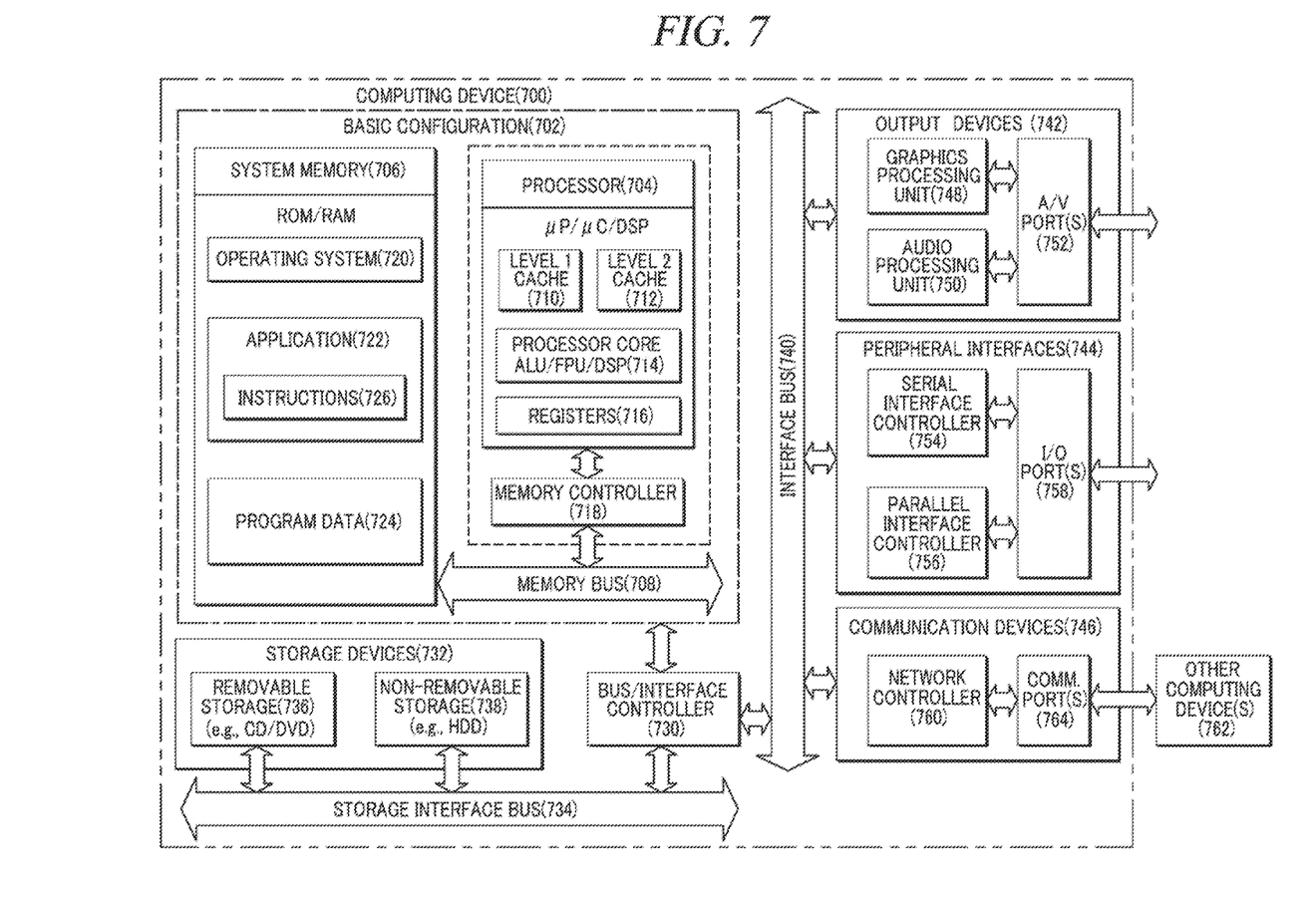
FIG. 7 is a block diagram illustrating an example computing device that may be utilized to provide a scheme for encoding offset images, arranged in accordance with at least some embodiments described herein.

FIG. 7 is a block diagram illustrating an example computing device that may be utilized to provide a scheme for encoding offset images, arranged in accordance with at least some embodiments described herein. In these examples, elements of computing device 700 may be arranged or configured for a device. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor ($\mu$P), a microcontroller ($\mu$C), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, an application 722, and program data 724. Application 722 may include instructions 726 that may be arranged to perform the functions as described herein including the actions described with respect to encoder architecture as shown in FIG. 4 or including the actions described with respect to the flow charts shown in FIG. 5. In some examples, application 722 may be arranged to operate with program data 724 on an operating system 720 such that the schemes for encoding offset images as described herein may be provided.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc As a non-limiting example, each range discussed herein can be readily broken down into a lower third, middle third and upper third, etc As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of an encoder, the method comprising:
receiving at least one picture frame during a first specific period, each of the at least one picture frame of the first specific period including a first offset image and a second offset image;
encoding a first offset image of a first picture frame of the at least one picture frame of the first specific period to generate a first side Intra picture (I picture), the first side I picture being generated in the first specific period;
receiving at least one picture frame during a second specific period, each of the at least one picture frame of the second specific period including a first offset image and a second offset image; and
encoding a second offset image of a first picture frame of the at least one picture frame of the second specific period to generate a second side I picture, the second side I picture having a different orientation than that of the first side I picture, the second side I picture being generated in the second specific period, wherein the second specific period is different from the first specific period.

2. The method of claim 1, further comprising:
encoding a second offset image of the first picture frame of the first specific period based, at least in part, on the generated first side I picture; and
encoding a first offset image of the first picture frame of the second specific period based, at least in part, on the generated second side I picture.

3. The method of claim 2, wherein:
the encoded second offset image of the first picture frame of the first specific period is a Predictive picture (P picture), and
the encoded first offset image of the first picture frame of the second specific period is a P picture.

4. The method of claim 2, further comprising:
encoding a first offset image of a second picture frame of the first specific period based, at least in part, on the encoded first offset image of the first picture frame of the first specific period;
encoding a second offset image of the second picture frame of the first specific period based, at least in part, on at least one of the encoded second offset image of the first picture frame of the first specific period or the encoded first offset image of the second picture frame of the first specific period;
encoding a second offset image of a second picture frame of the second specific period based, at least in part, on the generated second side I picture; and
encoding a first offset image of the second picture frame of the second specific period based, at least in part, on at least one of the encoded first offset image of the first picture frame of the second specific period or the encoded second offset image of the second picture frame of the second specific period.

5. The method of claim 4, wherein: each of the encoded first offset image and second offset image of the second picture frame of the first specific period is a Predictive picture (P picture), and
each of the encoded first offset image and second offset image of the second picture frame of the second specific period is a P picture.

6. The method of claim 1, further comprising:
encoding a second offset image of the first picture frame of the first specific period based, at least in part, on at least one of the generated first side I picture or a second offset image of a second picture frame of the first specific period; and
encoding a first offset image of the first picture frame of the second specific period based, at least in part, on at least one of the encoded second offset image of the first picture frame of the second specific period or a first offset image of a second picture frame of the second specific period.

7. The method of claim 6, wherein: the encoded second offset image of the first picture frame of the first specific period is a Bi-predictive picture (B picture) or a Predictive picture (P picture), and
the encoded first offset image of the first picture frame of the second specific period is a B picture or a P picture.

8. The method of claim 6, further comprising:
encoding a first offset image of the second picture frame of the first specific period based, at least in part, on at least one of the generated first side I picture or a first offset image of a third picture frame of the first specific period; and
encoding a second offset image of the second picture frame of the second specific period based, at least in part, on at least one of the encoded second offset image of the first picture frame of the second specific period or a second offset image of a third picture frame of the second specific period.

9. The method of claim 8, wherein: the encoded first offset image of the second picture frame of the first specific period is a Bi-predictive picture (B picture) or a Predictive picture (P picture), and
the encoded second offset image of the second picture frame of the second specific period is a B picture or a P picture.

10. The method of claim 1, wherein: the first offset image of the at least one picture frame of the first specific period and the first offset image of the at least one picture frame of the second specific period are obtained by one of a left side camera and a right side camera, which are communicatively coupled to the encoder, and
the second offset image of the at least one picture frame of the first specific period and the second offset image of the at least one picture frame of the second specific period are obtained by an other of the left side camera and the right side camera.

11. An encoder, comprising:
a receiver unit configured to:
receive at least one picture frame during a first specific period, each of the at least one picture frame of the first specific period including a first offset image and a second offset image; and
receive at least one picture frame during a second specific period, each of the at least one picture frame of the second specific period including a first offset image and a second offset image; and
an encoder unit configured to:
encode a first offset image of a first picture frame of the at least one picture frame of the first specific period to generate a first side Intra picture (I picture) of the first specific period, the first side I picture being generated in the first specific period;
encode, based at least in part on the first side I picture of the first specific period, a second offset image of the first picture frame of the at least one picture frame of the first specific period;
encode a second offset image of a first picture frame of the at least one picture frame of the second specific period to generate a second side I picture of the second specific period, the second side I picture having a different orientation than that of the first side I picture, the second side I picture being generated in the second specific period, wherein the second specific period is different from the first specific period; and
encode, based at least in part on the second side I picture of the second specific period, a first offset image of the first picture frame of the at least one picture frame of the second specific period.

12. The encoder of claim 11, wherein: the encoded second offset image of the first picture frame of the first specific period is a Predictive picture (P picture), and
the encoded first offset image of the first picture frame of the second specific period is a P picture.

13. The encoder of claim 12, wherein the encoder unit is further configured to:
encode a first offset image of a second picture frame of the first specific period based, at least in part, on the first side I picture of the first specific period to generate a P picture;
encode a second offset image of the second picture frame of the first specific period based, at least in part, on at least one of the encoded second offset image of the first picture frame of the first specific period or the encoded first offset image of the second picture frame of the first specific period to generate a P picture;
encode a second offset image of a second picture frame of the second specific period based, at least in part, on the second side I picture of the second specific period to generate a P picture; and
encode a first offset image of the second picture frame of the second specific period based, at least in part, on at least one of the encoded first offset image of the first picture frame of the second specific period or the encoded second offset image of the second picture frame of the second specific period to generate a P picture.

14. The encoder of claim 11, wherein the encoder unit is further configured to:
encode a second offset image of the first picture frame of the first specific period based, at least in part, on at least one of the first side I picture of the first specific period or a second offset image of a second picture frame of the first specific period, wherein:
to encode the first offset image of the first picture frame of the second specific period, the encoder unit is configured to encode the first offset image of the first picture frame of the second specific period further based on a first offset image of a second picture frame of the second specific period.

15. The encoder of claim 14, wherein: the encoded second offset image of the first picture frame of the first specific period is a Bi-predictive picture (B picture) or a Predictive picture (P picture), and
the encoded first offset image of the first picture frame of the second specific period is a B picture or a P picture.

16. The encoder of claim 14, wherein the encoder unit is further configured to:
encode a first offset image of the second picture frame of the first specific period based, at least in part, on at least one of the first side I picture of the first specific period or a first offset image of a third picture frame of the first specific period; and
encode a second offset image of the second picture frame of the second specific period based, at least in part, on at least one of the second side I picture of the second specific period or a second offset image of a third picture frame of the second specific period.

17. The encoder of claim 16, wherein: the encoded first offset image of the second picture frame of the first specific period is a Bi-predictive picture (B picture) or a Predictive picture (P picture), and the encoded second offset image of the second picture frame of the second specific period is a B picture or a P picture.

18. The encoder of claim 11, wherein: the first offset image of the at least one picture frame of the first specific period and the first offset image of the at least one picture frame of the second specific period are obtained by one of a left side camera and a right side camera, that are communicatively coupled to the encoder, and the second offset image of the at least one picture frame of the first specific period and the second offset image of the at least one picture frame of the second specific period are obtained by an other of the left side camera and the right side camera.

19. A non-transitory computer-readable storage medium having stored thereon computer-executable instructions that, in response to execution, cause an encoder to perform or control performance of operations, comprising:

obtain at least one picture frame during a first specific period, each of the at least one picture frame of the first specific period including a first offset image and a second offset image;

encode a first offset image of a first picture frame of the at least one picture frame of the first specific period to generate a first side Intra picture (I picture), the first side I picture being generated in the first specific period;

obtain at least one picture frame during a second specific period, each of the at least one picture frame of the second specific period including a first offset image and a second offset image; and encode a second offset image of a first picture frame of the at least one picture frame of the second specific period to generate a second side I picture, the second side I picture having a different orientation than that of the first side I picture, the second side I picture being generated in the second specific period, wherein the second specific period is different from the first specific period.

20. The non-transitory computer-readable storage medium of claim 19, wherein the operations further comprise:

encode a second offset image of the first picture frame of the first specific period based, at least in part, on the encoded first offset image of the first picture frame of the first specific period; and encode a first offset image of the first picture frame of the second specific period based, at least in part, on the generated second side I picture.

* * * * *